United States Patent [19]

Schutten et al.

[11] Patent Number: 4,706,184

[45] Date of Patent: Nov. 10, 1987

[54] FRACTIONAL FREQUENCY MULTIPLIER

[75] Inventors: Herman P. Schutten; Robert W. Sackett, both of Milwaukee; Jan K. Sedivy, Elm Grove; Michael E. Taken, Cedarburg, all of Wis.

[73] Assignee: Eaton Corportion, Cleveland, Ohio

[21] Appl. No.: 402,861

[22] Filed: Jul. 29, 1982

[51] Int. Cl.$^4$ .............................................. H02M 5/02
[52] U.S. Cl. .................................... 363/157; 363/163; 363/177
[58] Field of Search ........................................ 363/9–12, 363/157, 159, 160, 161, 163, 166, 169, 177; 318/768, 800; 318/807

[56] References Cited

U.S. PATENT DOCUMENTS

| | | | |
|---|---|---|---|
| 3,246,231 | 4/1966 | Clarke | 363/160 |
| 3,353,081 | 11/1967 | Stemmler | 318/807 |
| 3,718,854 | 2/1973 | Spyrou et al. | 363/160 |

FOREIGN PATENT DOCUMENTS

| | | | |
|---|---|---|---|
| 25925 | 7/1972 | Japan | 363/160 |
| 1077987 | 8/1967 | United Kingdom | 363/160 |

OTHER PUBLICATIONS

"Power Transistor Applications for Switching Regulators and Motor Control", Marvin W. Smith, General Electric Co., Semi-Conductor Products Dept., Auburn, N.Y., Oct., 1979, pp. 22–23.

Primary Examiner—William H. Beha, Jr.
Attorney, Agent, or Firm—Andrus, Sceales, Starke & Sawall

[57] ABSTRACT

An AC frequency conversion technique is provided by alternately switching between AC power lines at irregular times to yield a chopped sinusoid switched output waveform of given fundamental frequency. The technique does not rely on an input rectifier bridge nor on capacitive filtering to DC.

8 Claims, 4 Drawing Figures

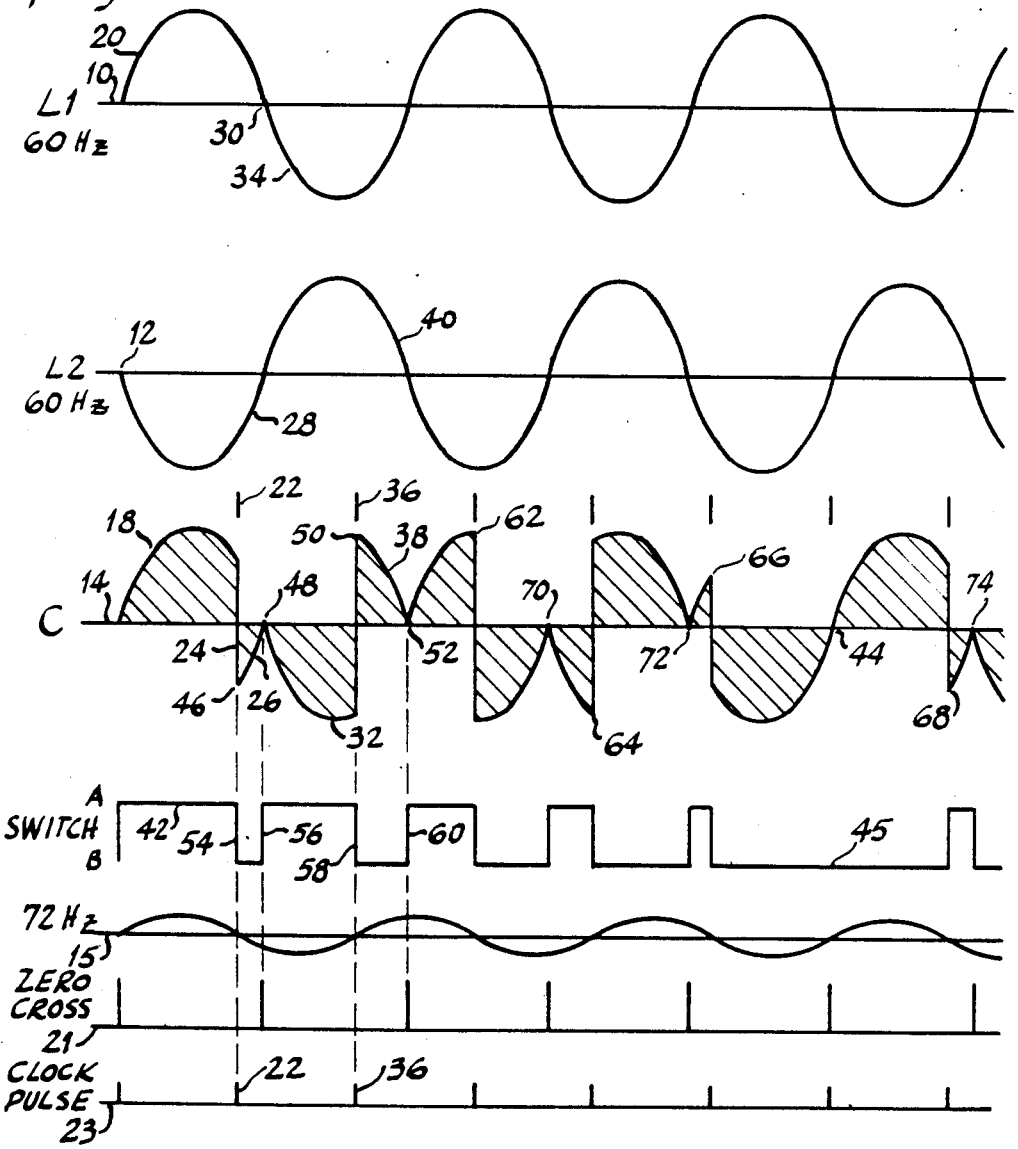

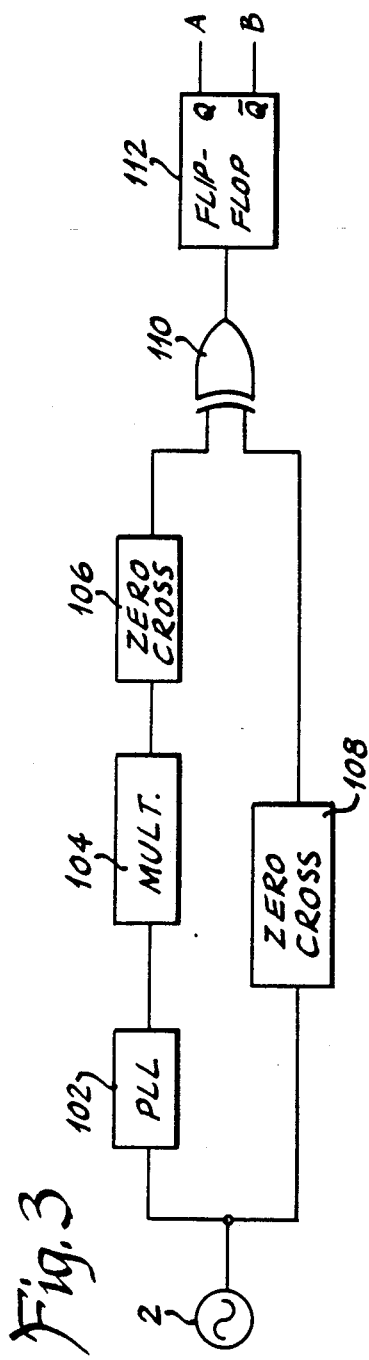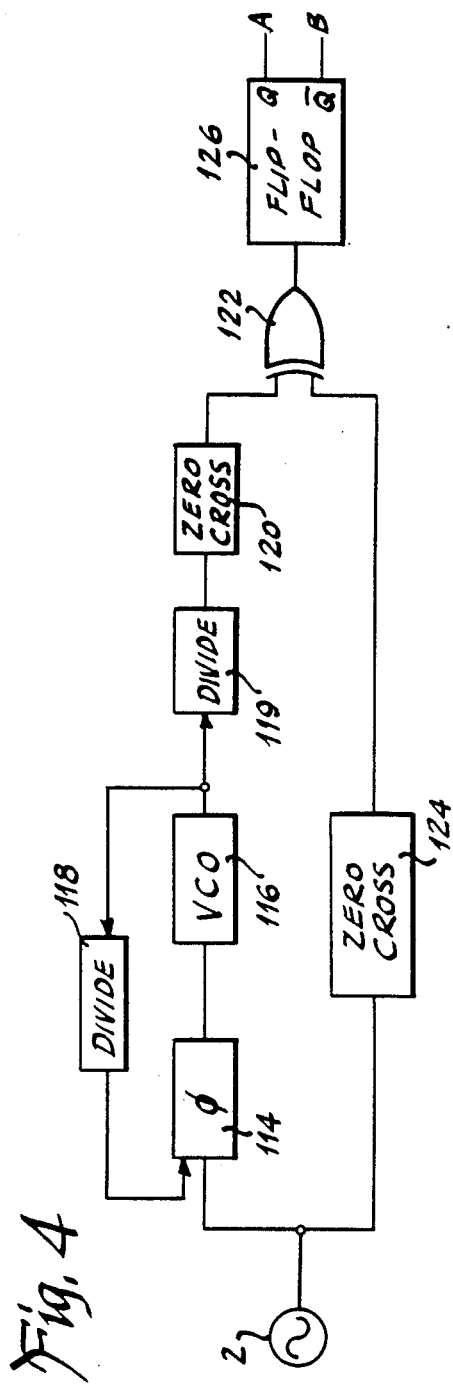

FRACTIONAL FREQUENCY MULTIPLIER

BACKGROUND AND SUMMARY

Various AC frequency conversion techniques are known in the art. One technique, called the inverterconverter approach, or the step converter method, rectifies the AC voltage through a diode rectifier bridge and smooths the rectified AC to level DC by means of a capacitor or the like. This level DC is then used to synthesize a series of incremental steps to approximate a given sine wave voltage of desired frequency, for example "Power Transistor Applications for Switching Regulators and Motor Control", Marvin W. Smith, General Electric Co., Semiconductor Products Dept., Auburn, N.Y., Oct., 1979, pages 22-23.

The present AC frequency conversion technique eliminates the capacitive filtering to DC. The present invention further eliminates the rectifier bridge by enabling a switched output to also perform the rectifying function by means of irregular switching times. In preferred form, a chopped sinusoid output waveform is provided by switching between a pair of power lines at a given frequency and also switching between the power lines in response to each zero crossing of the AC signal except when the zero crossing and the given frequency clock signal coincide in time.

The invention in particularly useful for up conversion in certain motor control applications, specifically where an increase in frequency is desired for only short periods of time compared with normal low frequency runtime. An example is refrigeration control where the compressor must be designed for the worst case situation even though such worst case occurs perhaps only 1% of the time, for example when a freezer must cool down a whole new supply of food. During the other 99% of the time, the compressor must only maintain an already cool condition, and thus may only need perhaps half its capacity. One solution to this over-capacity is to use a smaller compressor and run it at normal speed for normal duty, and run it at a higher speed during the small percentage of time needed for higher capacity cooling, i.e. during the 1% cool-down time. This faster speed operation is not detrimental to the compressor for short periods of time.

In the present invention, the AC frequency may be increased in a simple manner for running the compressor at a faster speed. A trade-off in the present frequency conversion technique is that the resultant chopped sinusoid switched output waveform of increased frequency is less efficient than the input AC frequency. This less efficient use of electrical power is far outweighed by the reduction in compressor capacity enabled thereby. Furthermore, during the 99% normal run-time, a smaller compressor is driven by a smaller motor at its most efficient load rating.

DESCRIPTION OF THE DRAWINGS

FIG. 1 is a schematic circuit diagram for illustrating the frequency conversion technique in accordance with the invention.

FIG. 2 is a timing diagram illustrating operation of the circuit of FIG. 1 in accordance with the invention.

FIG. 3 is a schematic circuit diagram illustrating a timing control for the switching in FIG. 2.

FIG. 4 is a schematic circuit diagram illustrating another timing control for the switching in FIG. 2.

DETAILED DESCRIPTION

In FIG. 1, a pair of power lines L1 and L2 are supplied with an AC signal from AC source 2 through transformer 4. Switched output means 6 is provided for alternately switching point C between points A and B of L1 and L2, respectively. A load 8 is connected between point C and a center tap 3 of the transformer, or alternatively to a grounded neutral of a 3 wire single phase AC source. The ground shown at 3 is the reference for timing lines, and is not required for operation. Switched output means 6 preferably comprises a first pair of anti-parallel back-to-back semiconductor power switches, such as power transistors, SCR's or the like, connected between points A and C, and a second pair of anti-parallel back-to-back semiconductor power switches connected between points B and C.

FIG. 2 shows on timing line 10 the AC waveform on L1 and at timing line 12 the AC waveform on L2. Timing line 14 shows the switched output waveform on point C. Point C switches to L1 at point A to provide output waveform segment 18 tracking waveform segment 20 on L1. At a given clock signal at 22, the output waveform on C switches to L2 at B as shown at transition 24, resulting in output waveform segment 26 which tracks segment 28 of L2. At zero crossing 30, the switched output 6 again toggles to connect point C to point A, resulting in output waveform segment 32 which tracks segment 34 of L1. The clock signal, which is of a given frequency, again occurs at 36, causing the output to switch to point B, resulting in output waveform segment 38 which tracks segment 40 of L2.

The switched output waveform on line 14 is a chopped sinusoid. Timing signal 42 shows the irregular switching times for toggling the output switch means 6 between points A and B. In the example in FIG. 2, the input AC signal frequency is 60 hertz, and the output waveform on line 14 has a fundamental frequency component of 72 hertz shown on line 15. The output C is switched between L1 and L2 in response to a 144 hertz clock signal, line 23, and is also switched between L1 and L2 in response to each zero crossing of the AC signal, line 21, except when the zero crossing and a clock signal coincide in time, for example as shown at point 44, line 14.

The chopped sinusoid output waveform on timing line 14 is irregular and has a plurality of inflection points in each cycle. In particular, the waveform on line 14 has an inflection point at each switched transition between points A and B in timing signal 42, for example inflection points 46, 48, 50, 52, etc. corresponding to switched transitions between A and B at 54, 56, 58, 60, etc., respectively. Inflection points 46, 50, 62, 64, 66, and 68 are due to the given frequency clock signal, e.g. the 144 hertz clock, line 21. Inflection points 48, 52, 70, 72 and 74 are due to the zero crossings of the AC. signal, line 23. At point 44, a zero crossing and a 144 hertz clock signal coincide, and toggling of switch 6 is prevented so that there is no switched transition of the output waveform, e.g. point C remains connected to point B at time 44 as shown by no transition at 45 on timing line 42.

The output waveform on timing line 14 has a positive half cycle during which it is switched to L1 when L1 is positive, and switched to L2 when L2 is positive. The output waveform has a negative half cycle during which it is switched to L1 when L1 is negative, and switched to L2 when L2 is negative. The chopped sinusoid output waveform is not as efficient as the input 60 hertz waveform. This is because of the chopping and reversal of the various waveform segments preventing buildup of voltage. For example, in the negative half cycle provided by waveform segments 26 and 32, the voltage rises negatively and then falls back to zero at point 48 and then rises negatively again. This is not as efficient a half cycle of a non-chopped sinusoid, but may be tolerated in certain applications as noted above.

The irregular switching pattern shown by timing signal 42 provides both the chopping of the incoming AC signal for frequency conversion and also performs the rectification function previously performed by a diode rectifier bridge or the like. In one implementation, this irregular timing pattern is provided by exclusively ORing the given frequency clock signal and the zero crossings of the AC signal to toggle between L1 and L2 at points A and B.

FIG. 3 shows one form of this implementation in which the given frequency clock signal is provided by a phase lock loop 102 extracting the frequency of the AC signal from source 2, which frequency is multiplied by a clock multiplier 104 or the like such as a frequency synthesizer, and delivered to a zero crossing detector 106 whose output provides the clock signal on timing line 23. For the example in FIG. 2, the given multiple in multiplier 104 is 6/5. The AC signal from source 2 is delivered to a zero crossing detector 108 whose output provides the zero crossings signal on timing line 21. The clock signal from 106 and the zero crossings from 108 are input to an exclusive OR gate 110 whose output toggles a flip flop 112 between its Q and $\overline{Q}$ outputs to switch between points A and B, thus yielding the irregular switching pattern 42 in FIG. 2.

FIG. 4 shows another timing control wherein the phase detector 114 and voltage controlled oscillator 116 of the phase lock loop have a feed-back divider 118, such as a counter, from the output of VCO 116 to the input of phase detector 114. As is known, if the divider 118 performs a divide by 6 operation, then the output of VCO 116 will have a frequency 6 times as great as the input from source 2. The output of VCO 116 is delivered to another divider 119 which in the above example performs a divide by 5 operation. The output of divider 119 has a frequency 6/5 as great as the input frequency from source 2 and is delivered to zero crossing detector 120, whose output is the clock signal to one of the inputs of exclusive OR gate 122. The other input to exclusive OR gate 122 is from zero crossing detector 124 from source 2. The output of gate 122 toggles flip-flop 126 between A and B.

While the 60 hertz line and 72 hertz output frequencies have been given as examples, it is readily appreciated that other fractional frequency changes are within the scope of the invention. For example, in FIG. 4, divider 118 provides the numerator and divider 119 provides the denominator of the frequency change fraction. Furthermore, it is not necessary that switch 6, or zero crossing detectors 106 or 120, be controlled by some fraction of AC line frequency. For example, the switch can be toggled at a variable frequency rate to produce a variable frequency output.

It is recognized that various modifications are possible within the scope of the appended claims.

We claim:

1. A frequency conversion technique for an AC signal supplied to a pair of power lines L1 and L2 by an AC source, comprising alternately switching between L1 and L2 by first switching to L1 and then switching to L2 and then switching back to L1 and so on at irregular times to yield a switched output waveform of a given fundamental frequency, said switched output waveform comprising a chopped sinusoid switched at any point in the AC cycle to yield any up-converted output frequency.

2. A frequency conversion technique for an AC signal supplied to a pair of power lines L1 and L2 by an AC source, comprising alternately switching between L1 and L2 at irregular times to yield a switched output waveform of a given fundamental frequency, wherein said switched output waveform comprises a chopped sinusoid, and comprising switching between L1 and L2 in response to a given frequency clock signal and also switching between L1 and L2 in response to each zero crossing of said AC signal except when said zero crossing and said clock signal coincide in time.

3. The invention according to claim 2 wherein the said chopped sinusoid output waveform has an inflection point at each switched transition between L1 and L2.

4. The invention according to claim 3 comprising exclusively ORing said clock signal and said zero crossings of said AC signal to toggle between L1 and L2.

5. A frequency conversion technique for an AC signal supplied to a pair of power lines L1 and L2 by an AC source, comprising alternately switching between L1 and L2 at iregular times to yield a switched output waveform of a given fundamental frequency, wherein said switched output waveform comprises a chopped sinusoid, and comprising switching between L1 and L2 at a given multiple of the frequency of zero crossings of said AC signal, and also switching between L1 and L2 in response to each zero crossing of said AC signal except when said zero crossing and said multiple coincide in time.

6. The invention according to claim 5 wherein said output waveform has a positive half cycle during which it is switched to L1 when L1 is positive and switched to L2 when L2 is positive, and said output waveform has a negative half cycle during which it is switched to L1 when L1 is negative and switched to L2 when L2 is negative.

7. The invention according to claim 6 wherein said output wave form is switched between L1 and L2 by exclusively ORing said multiple and said zero crossings of said AC signal to provide a chopped sinusoid output waveform having an inflection point at each switched transition between L1 and L2.

8. Frequency conversion apparatus for an AC signal comprising:
a pair of power lines L1 and L2 supplied with an AC signal from an AC source; and
switched output means for alternately switching between L1 and L2 at irregular times to yield a chopped sinusoid switched output waveform of given fundamental frequency, and including given frequency clock signal means, zero crossing detector means for said AC signal, and means for exclusively ORing the output of said clock signal means and said zero crossing means for switching between L1 and L2 in response to a given frequency clock signal and also switching between L1 and L2 in response to each zero crossing of said AC signal except when said zero crossing and said clock signal coincide in time, such that said chopped sinusoid switched output waveform has a positive half cycle during which it is switched to L1 when L1 is positive and switched to L2 when L2 is positive, and such that said chopped sinusoid switched output waveform has a negative half cycle during which it is switched to L1 when L1 is negative and switched to L2 when L2 is negative.

* * * * *